UNITED STATES PATENT OFFICE.

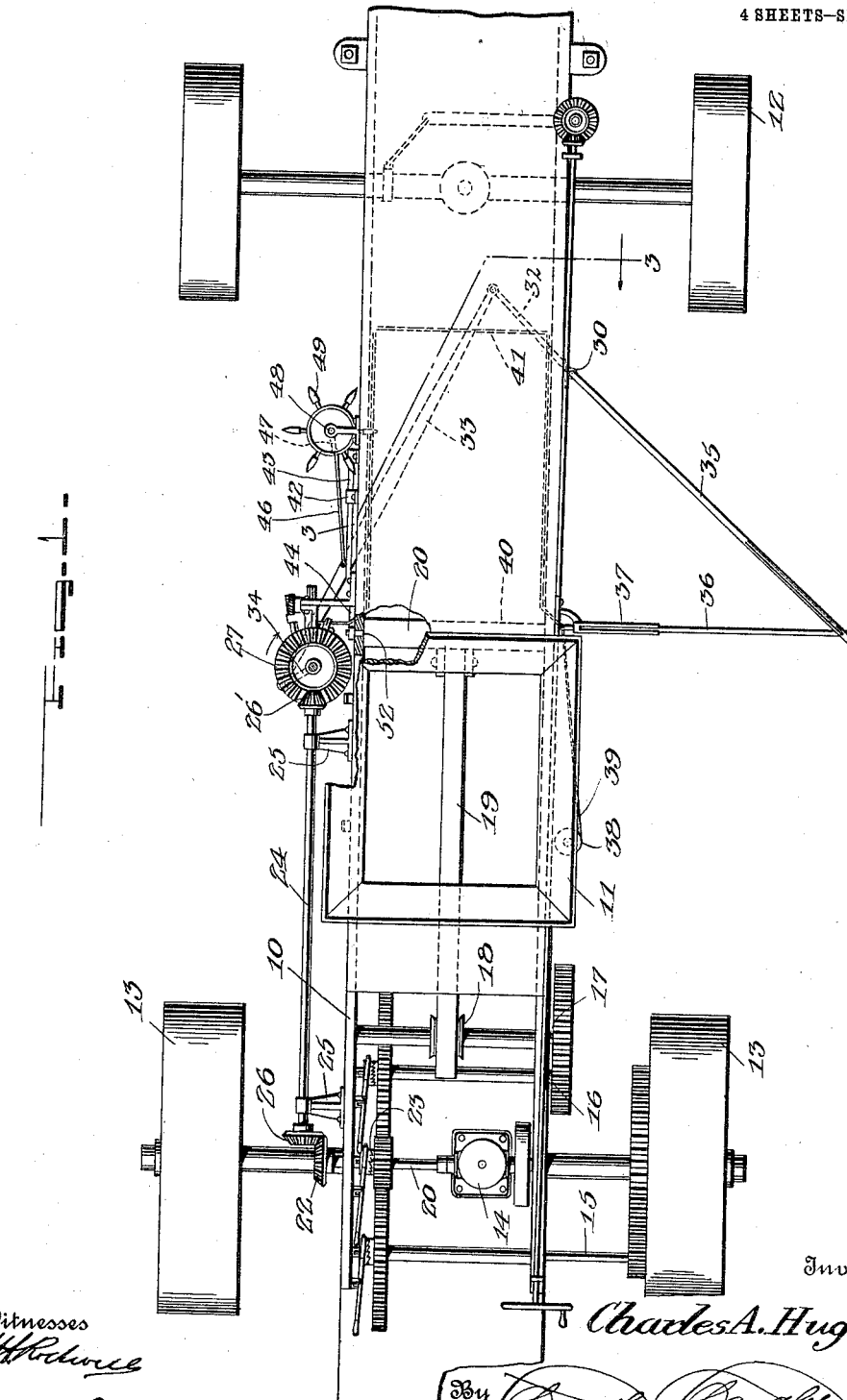

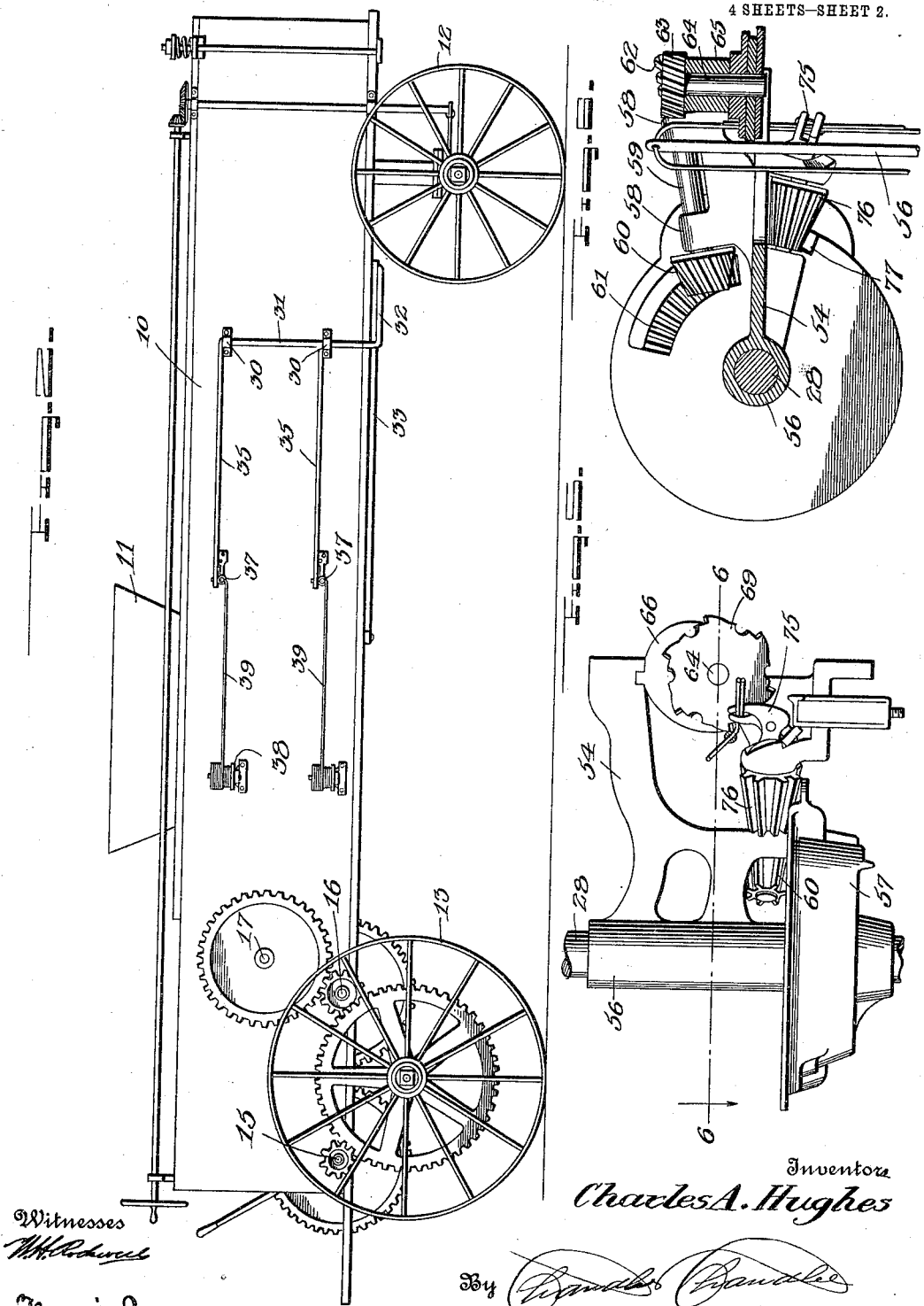

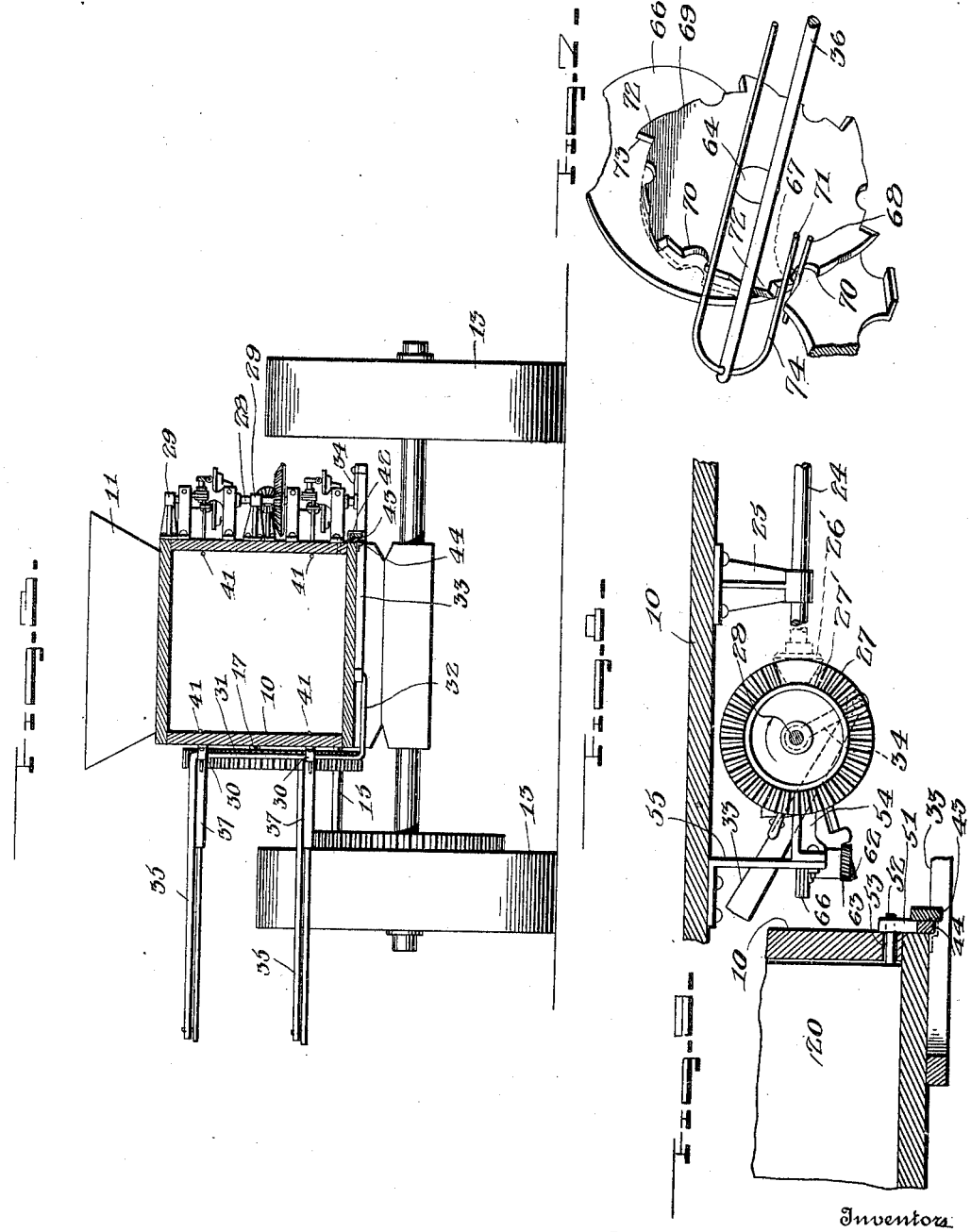

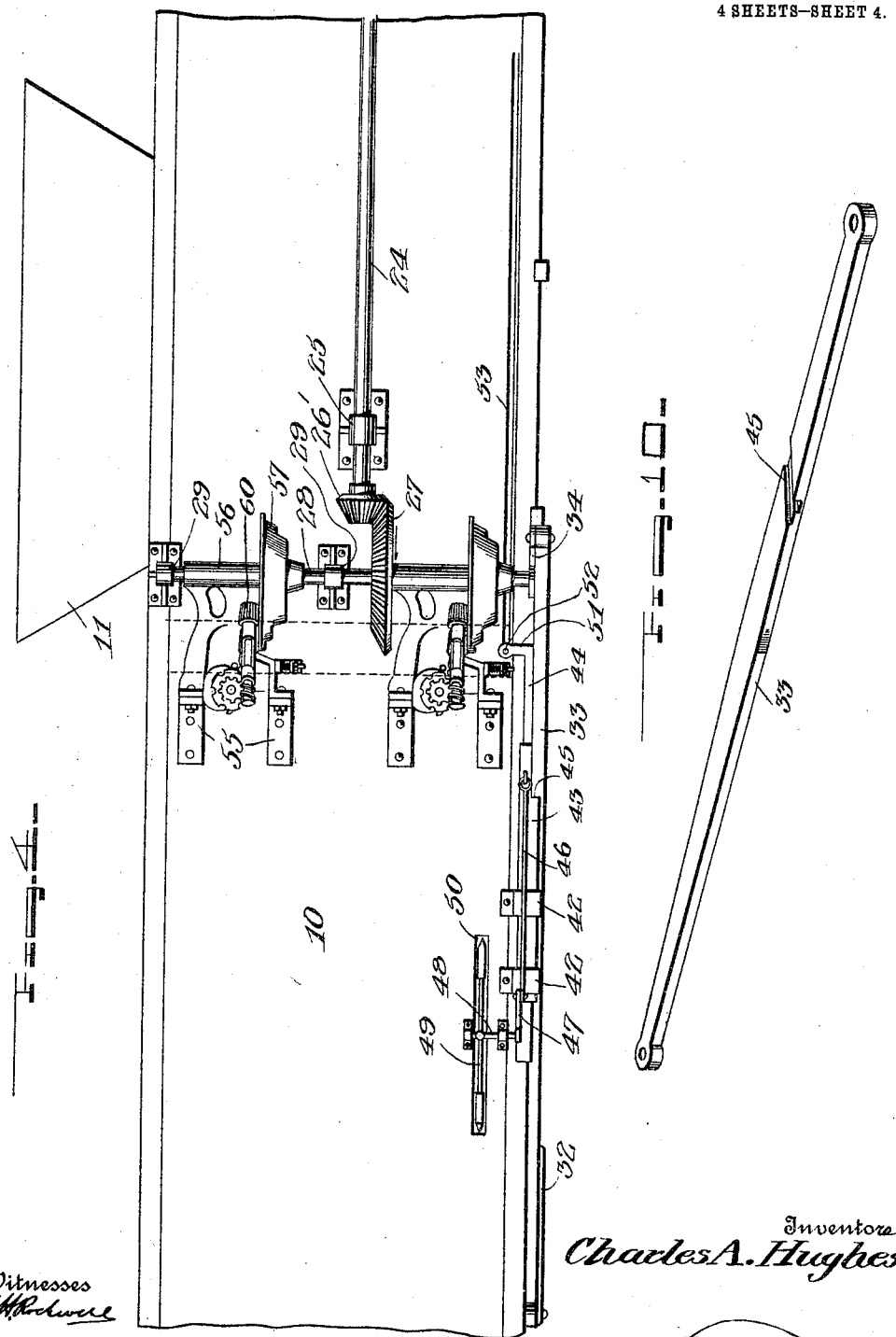

CHARLES A. HUGHES, OF OLD CONCORD, PENNSYLVANIA.

HAY-PRESS.

1,006,220.  Specification of Letters Patent.  Patented Oct. 17, 1911.

Application filed June 22, 1911. Serial No. 634,699.

*To all whom it may concern:*

Be it known that I, CHARLES A. HUGHES, a citizen of the United States, residing at Old Concord, in the county of Washington, State of Pennsylvania, have invented certain new and useful Improvements in Hay-Presses; and I do hereby declare the following to be a full, clear, and exact description of the invention, such as will enable others skilled in the art to which it appertains to make and use the same.

This invention relates to hay presses, more particularly to means for binding the finished bales with wire.

An object of the present invention is to provide a novel cutter for holding one end of the wire while the bale is being formed, this cutter being designed to sever the held end of the wire and also to sever that end of the wire which has been laid into the cutter by the needle when the bale is finished, the severing of both ends of the wire being nearly simultaneous and performed prior to twisting of the severed ends together by the ordinary knotting mechanism.

A further object of the invention is to provide a novel mechanism for actuating the needle, this mechanism being held quiescent by double locking means including a sliding link actuated by the presser head, and a second sliding link carried by a bale turned spoked wheel, the entire disengagement of both links being required before actuation of the needle driving mechanism.

With the above objects in view the invention consists in certain novel details of construction and combination of parts hereinafter fully described and claimed, it being understood that various modifications may be made in the minor details of construction within the scope of the appended claims.

In the accompanying drawing forming part of this specification: Figure 1 is a plan view of a hay press equipped with my improvements. Fig. 2 is a side elevation of the hay press showing the needles and wire spools. Fig. 3 is a cross sectional view taken on the line 3—3 Fig. 1. Fig. 4 is an enlarged fragmentary side elevation of the hay press showing the bale binding mechanism. Fig. 5 is a side elevation of a conventional knotting mechanism in combination with my improved wire holding and cutting means. Fig. 6 is a cross sectional view taken on the line 6—6 Fig. 5. Fig. 7 is a detailed perspective view of my improved holding and cutting mechanism. Fig. 8 is a fragmentary plan view of the needle driving mechanism. Fig. 9 is a fragmentary sectional view through the presser casing showing the two sliding links locking the needle pitman quiescent. Fig. 10 is a detailed perspective view of the needle pitman.

Referring now to the drawing in which like characters of reference designate similar parts, 10 designates the presser box or casing which is oblong in contour and which is provided centrally with a hopper 11. Dirigible front wheels 12 support the forward end of the casing, and traction wheels 13 support the rear end, a gas engine 14 carried within the casing being utilized for driving the traction wheels. A clutch controlled shaft 15 is operatively connected to the engine driving shaft and one of the rear traction wheels for attaining this end. A second clutch controlled shaft 16 is operatively connected to a shaft 17 which shaft is equipped centrally with a gear 18 that engages the rack plunger 19 having a presser head 20 at its forward end. These parts are described in U. S. Letters Patent, issued to me on the 13th day of October, 1910, under Ser. No. 976,368, and form no part of the present invention.

The bale binding mechanism forming the subject-matter of this invention is operated by the gas engine 14, the shaft 21 of which extends through one side of the casing and is equipped with a bevel pinion 22, the latter being manually controlled by a clutch 23 of any preferred construction arranged on the engine shaft within the casing. A driven shaft 24 is mounted in suitable bearings 25 on the casing side and is equipped at its opposite ends with bevel pinions 26 and 26' one of which meshes with the engine shaft pinion 22 and the other of which meshes with and intermittently drives a horizontally disposed bevel pinion 27 arranged on a stand shaft 28 carried in suitable bearings 29 arranged on the casing side. A number of the teeth of the gear 27 are removed to provide a seat 27' in which the pinion 26' normally rests, the gear being given an initial rotation by the tension of the binding wire as will presently be more fully described, to advance the gear into mesh with the pinion. In this way the shaft 28 is intermittently rotated.

The intermittently actuated shaft 28 serves to pass the bale binding needles transversely across the end of the finished bale as will now be described. Arranged on the opposite side of the casing from the shaft is a pair of vertically alined bearings 30 in which is journaled a shaft 31 which is provided at its lower end with a horizontally disposed crank 32, that extends underneath the bottom of the casing and is pivotally connected to one end of a pitman 33, this pitman extending obliquely across the casing bottom and being connected at its opposite end to a crank 34 arranged upon the lower end of the stand shaft 28. During the intermittent actuation of the pitman, the shaft 31 will be actuated. This shaft is equipped with a pair of parallel arms 35 to the outer ends of which are connected needles 36, these needles being mounted in suitable tubular bearings 37 arranged on the casing side. The needles work through suitable openings formed in the casing side and move transversely across the interior of the casing at each actuation of the pitman. A pair of wire carrying spools 38 are mounted on suitable spindles arranged on the casing side and the binding wires 39 from these spools are led through the eyes of the needle, thence transversely across the casing as shown in dotted lines at 40 in Fig. 1, and manually engaged in the holding notch of a holding mechanism which will be hereinafter fully described. As the hay is fed in through the hopper, and is driven forwardly in the casing by the presser head 20, these wires 40 assume U-shapes as shown by the dotted lines 41 in Fig. 1. After the bale has grown to a predetermined size, the plunger is stopped and the presser head comes to rest at such a position that the needles may freely pass between the presser head and bale and draw the binding wires transversely across the end of the finished bale to the severing and knotting mechanism above referred to. After the wires are severed and knotted the needles return to their initial positions to permit of the bale being thrust out of the casing as the new bale grows in size.

As above stated, in one of the objects of the invention, the pitman 33 is positively locked in quiescent position until the bale has grown to the desired size, and to accomplish this the following mechanism is employed: Slidingly fitted in the blocks 42 arranged on the casing side is a pair of links 43 and 44, these links lying side by side, and further fitting in a groove 45 which is formed obliquely across the top face of the pitman. The outermost link 43 is connected near its forward end to a pitman 46, the opposite end of this pitman being connected to a crank 47 carried on the lower end of a vertically disposed stub shaft 48 upon which is fixed a spoked wheel 49 that projects through a slot 50 formed in the casing side and engages with and is rotated by the growing bale. When the bale has grown to the predetermined size, the wheel will have rotated to such an extent as to move the crank, pitman and link forwardly so that the link advances out of the groove.

The inner link 44 is provided with an upstanding orificed lug 51 through which a pin 52 is engaged, this pin projecting through a slot 53 formed in the casing side and being fixed in the edge of the presser head 20. The link is reciprocated during actuation of the plunger, and when the latter is finally withdrawn to its inward limit of movement after the bale has been completed, the link will be drawn out of the slot in the pitman. When both of the links 43 and 44 have been drawn out of the slot in the pitman as above described, the latter is free to move, and will be moved immediately to a certain extent by means of the tension of the wire 41, this tension of the wire serving to move the pitman sufficiently to rotate the gear 27 into mesh with the pinion of the driving shaft 24 and cause the needles to be simultaneously moved across the end of the bale and carry the wire to the severing and knotting mechanism which will now be described. There are two sets of severing and knotting mechanisms, one set for each needle, and since both are identical in construction but one will be described. A knotter frame 54 is fixed to brackets 55 arranged on the side of the casing, the knotter frame being provided with a sleeve 56 which surrounds the stand shaft 28 above described, and on this knotter frame is a horizontally disposed casing 57 in which is arranged the usual cam and gear wheel for giving motion to all of the moving parts of the knotting mechanism, the cam and gear wheel being operatively connected to the stand shaft 28. On the knotter frame bearings 58 is journaled a shaft 59 having a pinion connection 60 at one end engaging with the toothed segment 61 of the gear wheel which latter gives intermittent motion to the shaft 59 as usual in devices of this character. The outer end of the shaft is equipped with a worm 62 which meshes with a pinion 63 carried on a shaft 64 arranged in a suitable bearing 65 on the frame, the free end of this shaft being equipped with novel holding and severing mechanism about to be described.

A thin washer like bearing 66 is provided with an opening for the reception of the shaft 64 and is provided in its periphery with a groove or notch 67 in which the end 68 of the binding wire is manually laid before setting the plunger in operation. On opposite sides of the washer are arranged disks 69, each disk being fixed to the shaft and being rotated thereby. Arranged at intervals in the periphery of each disk are rounded notches 70, the floor of each notch at the rear side of the notch or in other words at that side of the notch opposite to the direction of rotation of the disk, being beveled to provide a cutting edge 71. The timing of the rotation of the disk is such that each time the disk becomes quiescent, one of the notches 70 will register with the notch in the washer as most clearly shown in Fig. 7 and receive the end of the wire 68. That disk which lies most remote from the side of the casing is provided peripherally with a plurality of approximately triangular teeth 72, these teeth being spaced directly in rear of the notches and being provided with beveled leading edges which form cutting edges 73. When the needle 36 passes across the end of the bale, as above described, the wire will have been carried entirely around the bale and the end 74 of the wire will be laid by the needle against the cutting edge of one of the teeth 72. The rotation of the shaft 64 is so timed that after the wire has been laid by the needle against the tooth, the shaft will be rotated, and thus the initial end 68 of the wire together with the final end 74 of the wire will be almost simultaneously severed by the cutting edge 71 of the groove and cutting edge 73 of the tooth, it being understood that both ends of the wire have been previously gripped and held by knotters 75 which will be presently described. After severing of the wire ends, the rotation of the disks continue at such a rate as to permit of the severed end of the wire carried by the needle, when going back, being caught by the notch 70 next in rear of the notch which has just severed the wire, and upon catching of the wire, rotation of the disks ceases so that upon the return of the needle to its initial position a length of wire is laid transversely across the interior of the casing to be pressed into U-shape by the forming of a new bale as above described. Thus the laying of the wire in the cutting disks and washer is automatic and requires no manual attention. The knotting fingers 75 above referred to are of the usual kind and are rotated to twist the ends of the wires after severing, through the instrumentality of a pinion 76 which meshes with the teeth 77 of the cam gear within the casing 57, in the usual manner. The mechanism for actuating the knotting fingers and for actuating the cutting disks is of the usual and well known kind and forms no part of the present invention.

It will be noted that the tying mechanism is spaced considerably from the side of the casing, the preferred distance being about six inches. The value of this feature is that after the knot has been tied, there will be a slight amount of slack in the binding wire, this slack being taken up upon expansion of the bale after it is removed from the pressure of the baling chamber.

What is claimed, is:—

1. In a hay press, a presser head, a needle, a pitman actuating said needle, said pitman having a notch therein, a link connected to said presser head and normally seated in said notch, a second link seated in said notch, and bale moved means operatively connected to the second named link, said links coacting to lock said pitman stationary.

2. In a hay press, a presser head, a reciprocating needle movable across the face of said head, a pitman, a rocking link connection between said needle and said pitman, means for intermittently actuating said pitman, said pitman having a locking notch in one face, a sliding link normally seated in said notch and operatively connected to said presser head, a bale operated means, a second sliding link normally seated in said notch, and connected to said bale operated means, said links normally locking said pitman against movement and being disengagable from said pitman for permitting movement of the pitman.

3. In a hay press, a casing, a reciprocating presser head in said casing, a needle reciprocating across said casing, a rocking link connected at one end with said needle, a pitman secured to the bottom of said casing and connected to the other end of said link, a spoked wheel on one side of said casing projecting into said casing and movable by a bale, said pitman having a notch in its upper face, a pair of sliding links seated in said notch and operatively connected to said spoked wheel, said links coacting in locking said pitman against movement and being freed from said notch by said presser head and spoked wheel to permit of movement of said pitman.

4. In a hay press, the combination of a casing, a reciprocating presser head in said casing, a needle movable transversely across the interior of said casing, a pitman operatively connected to said needle, said pitman having a notch in one face, a pair of sliding links normally seated in said notch, one of said links being connected to said presser head, the other of said links being connected to a bale operated means, said links locking said pitman against movement, and being withdrawn from said pitman to permit of movement of the pitman, and an intermittently actuated driving shaft operatively connected to said pitman.

5. In a hay press, a casing, a needle movable across the interior of said casing, means for actuating said needle, and a combined holding and severing mechanism including a disk like support having a wire holding notch in one edge, and an intermittently rotatable disk on one side of said support having a series of wire holding notches in its periphery, and having a series of peripheral teeth in rear of said notches.

6. A hay press including a casing, a needle movable transversely across said casing, means for actuating said needle, and a combined holding and severing mechanism including a washer-like abutment having a wire holding notch in its edge, an intermittently revoluble disk having a series of wire holding notches in its periphery, the floor portion of each notch being beveled to form a cutting edge, and a series of peripheral teeth on said disk having their leading edges sharpened to form cutting edges.

In testimony whereof, I affix my signature, in presence of two witnesses.

CHARLES A. HUGHES.

Witnesses:
HIRAM DAY,
WM. ASHBROOK.

Copies of this patent may be obtained for five cents each, by addressing the "Commissioner of Patents, Washington, D. C."